United States Patent
Rood

(10) Patent No.: US 7,022,374 B2
(45) Date of Patent: Apr. 4, 2006

(54) NEGATIVE STATIC ELECTRICALLY CHARGED COATING METHOD AND COMPOSITION FOR REPELLING DUST FROM GLASS

(76) Inventor: Leonard D. Rood, 10586 Tropical Breeze La., Boynton Beach, FL (US) 33427

( * ) Notice: Subject to any disclaimer, the term of this patent is extended or adjusted under 35 U.S.C. 154(b) by 0 days.

(21) Appl. No.: 11/186,292

(22) Filed: Jul. 21, 2005

(65) Prior Publication Data

US 2005/0255252 A1   Nov. 17, 2005

Related U.S. Application Data

(63) Continuation-in-part of application No. 10/966,457, filed on Oct. 16, 2004, now abandoned, which is a continuation-in-part of application No. 10/393,107, filed on Mar. 20, 2003, now abandoned.

(51) Int. Cl.
*B05D 1/26* (2006.01)

(52) U.S. Cl. .................. 427/165; 427/11; 427/429

(58) Field of Classification Search .......... 427/11

See application file for complete search history.

(56) References Cited

U.S. PATENT DOCUMENTS

| | | | |
|---|---|---|---|
| 3,498,923 A | | 3/1970 | Zisman et al. |
| 4,420,578 A | * | 12/1983 | Hagens et al. ............. 524/322 |
| 4,511,489 A | | 4/1985 | Requejo et al. |
| 5,415,927 A | * | 5/1995 | Hirayama et al. ....... 428/307.3 |

* cited by examiner

*Primary Examiner*—Katherine Bareford
(74) *Attorney, Agent, or Firm*—Frank H. Foster; Kremblas, Foster, Phillips & Pollick

(57) ABSTRACT

A liquid which has a negative static electrical charge is pre-coated onto a paper or fabric towel and the coated, negative static electrically charged paper or fabric towel is rubbed onto positive, static electrically charged glass windows, automobile and truck windshields, and glass mirrors in sufficient quantity to cause the surfaces to become negatively charged. Since like static electrical charges will repel each other, the negative static electrically charged liquid will repel negative static electrically charged human fibers, dust and other negatively charged fibers. If the film is not thin, the coating will be streaked. The coating is water insoluble and preferably is a water insoluble silicone oil, preferably in an amount of at least 70% silicone and most preferably comprises liquid polydimethylsiloxane. The coating can be mixed with a water insoluble, silicone soluble, liquid comprising the remaining 30% or less. The resulting composition should have a viscosity substantially in the range of 5 to 50 centistokes.

4 Claims, No Drawings

NEGATIVE STATIC ELECTRICALLY CHARGED COATING METHOD AND COMPOSITION FOR REPELLING DUST FROM GLASS

CROSS-REFERENCES TO RELATED APPLICATIONS

This application is a continuation-in-part of my patent application, Ser. No. 10/966,457 filed Oct. 16, 2004 and now abandoned, which was a continuation-in-part of my previously patent application, Ser. No. 10/393,107, filed Mar. 20, 2003 and now abandoned.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

1. Field of the Invention

This invention relates to a means which will convert a positive static electrically charged glass surface to a negative static electrically charged surface so that it will repel human fibers, dust and silica based dirt.

2. Description of the Related Art

House dust contains human negative static electrically charged fibers and other particles. This dust will attach to positive static electrically charged glass windows, mirrors and other glass objects. Typical dust cleaning solutions for glass use water and a surfactant to remove surface dust; however, because the surfaces remain positive static electrically charged, negative static electrically charged dust will recoat the positive static electrically charged substrates.

U.S. Pat. No. 4,511,489 to Requejo, et al issued on Apr. 16, 1985, refers to a cleaning and polishing composition for acrylic plastic substrates, including Plexiglas, Lucite, Lexan and the like. An aqueous dispersion of a fluid silicone oil, such as polydimethyl siloxane, a nonionic or anionic surfactant, such as sodium lauryl sulfate, and a fluorinated organic surface-active compound are mixed with water and is applied to the plastic surface, after which the plastic surface is dried with a paper towel or other device. The amount of silicone applied varies from about 0.5% to 10% by weight of the of the cleaning composition, preferably 1 to 5% by weight, especially preferably about 2% by weight, based on the total composition, on an active basis. The viscosity of the silicone oil varies from 40 to 100,000 centistokes, preferably from 40 to 1000 centistokes and most preferably from 200 to 500 centistokes.

The patent claims that these compositions provide dust repelling, cleaning and polishing, especially suitable for Plexiglass and other acrylic plastic materials. The patent also asserts that this treatment provides a thin lubricating coating on the plastic substrate which causes the treated surface to become smooth, slippery and electrostatically inert, thereby preventing the collection of dust, oil, grime and other soils on the surface.

The fact that the inventor of U.S. Pat. No. 4,511,489 refers to the static electrical nature of the composition of the invention as being inert and antistatic indicates that the composition does not retain a net negative static electrical charge on the surface after application. The characteristic of being "antistatic" means that the material discharges or neutralizes the static charge on the surface. Discharging is commonly accomplished with an electrolyte, including water with dissolved ions, which can conduct electrical charge and therefore can discharge a statically charged surface. Although discharging a positively charged surface will help reduce the attraction between the surface and negatively charged, airborne particles, it is preferable to provide a negatively charged surface, rather than a neutral surface, in order to actively repel those particles. The surface can also be discharged by providing sufficient negative charge to neutralize the positive surface charge. However, for a water soluble material, while an amount of negative charge equal to the positive surface charge can be held on the positive charged surface by the electrical field attraction, if the material is water soluble, any excess beyond the amount to cause neutralization will be discharged and/or removed by water in the product or rain and/or atmospheric moisture.

Referring to the Triboelectricity series, acrylic plastic surfaces such as Lucite do not retain a static electrical charge since they are in the middle of the chart. They retain neither positive static electrical nor negative electrical charges. The antistatic film composition used on the Lucite was electrostatically inert, but must have had some small negative static electrical charge to repel dust for a period of 3 days to 2 weeks. However, it did fail to repel dust after this 2 week period.

In the case of glass windows and mirrors, the positive static electrical charge of the glass is large since glass stands near the top of the positive static electrical portion of the Triboelectric Series chart. It therefore takes a strong negative static electrical charge of the silicone to overcome the strong positive static electrical charge of the glass mirror or window. The cleaning and polishing silicone compositions used in U.S. Pat. No. 4,511,489 were antistatic and inert; thereby they would be too weak to overcome the strong positive static electrical charge of the glass.

Enclosed areas, such as homes and the inside of automobiles, are subjected to dust and human skin fibers, which coat susceptible surfaces. These surfaces, such as glass mirrors, glass windows and the inside glass surfaces of an automobile are static electrically positively charged and will attract negative static electrically charged human fibers and dust. Washing the glass surface with water and detergent mixtures will remove the dust and human fibers, but the cleaned surface will reattract the dust and human fibers because there is a static electrical attraction between the positive static electrically charged surface and the negative static electrically charged human fibers and dust.

The object of the present invention is to provide a strong negative static electrically charged liquid composition which will not only neutralize the strong positive static electrical charge on the glass surface, but will provide a negative electrical surface charge that is durable so it will remain effective for an effective, practically useful period of time after application, even up to a year.

Dust may contain fabric fibers, human skin particles, animal dander, and microscopic creatures called mites. Bacteria, mold spores, food particles and other debris. The static electrical charge on these particles is negative. These particles and fibers will adhere to positive static electrically charged surfaces. Coating of these surfaces with a strong, thin, negative static electrically charged coating will inhibit the adhesion of these particles to the surface. The coating should be thin because thicker coatings may cause streaking.

Outside dirt is primarily based on silica, which has a negative static electrical charge. Coating a surface such as the outside of a window or the outside of an automobile windshield with a negative static electrically charged coating will also inhibit silica based dirt attachment to the glass.

BRIEF SUMMARY OF THE INVENTION

The invention is a treatment for a glass surface so that the glass surface will repel human fibers, dust and silica based dirt. The treatment method is to rub a pre-coated paper or cloth sheet containing a liquid, water insoluble silicone, most preferably a polydimethylsiloxane onto the glass surface. The concentration of the water insoluble silicone should be at least substantially 70% by weight. The water insoluble silicone liquid may be used with a water insoluble, silicone soluble liquid comprising the remaining 30% or less. The resulting composition should have a viscosity substantially in the range of 5 to 50 centistokes.

BRIEF DESCRIPTION OF THE SEVERAL VIEWS OF THE DRAWINGS (Not applicable.)

DETAILED DESCRIPTION OF THE INVENTION

The key to understanding the underlying static electrical basis of dust and human fiber adhesion is to recognize that materials will repel or attract depending on their static electrical charges. Like elements will repel, unlike elements will attract. A method of determining the static electrical charge of dust or human fibers is to rub the flat side of a nylon toothbrush about 50 times on a piece of wool. Then attempt to attract the material with the flat side of the toothbrush. If the material is positive static electrically charged, it will attach to the flat side of the toothbrush. If the material is negative static electrically charged, it will not be attracted.

An alternative procedure is to rub the face of the toothbrush 50 times onto a roll of Teflon tape, after removing the static electrical charge by grounding the toothbrush on metal. After rubbing on the Teflon tape, the human fibers and house dust were attracted to the face of the toothbrush, also indicating that they were negative static electrically charged.

The phenomenon called static electricity occurs when there are an excess of positive (+) or negative (−) charges on an object's surface. This condition is caused by rubbing certain materials together. Static electricity is not caused by rubbing alone. The position of the material in the Triboelectric Series determines how effectively the charges will be exchanged.

In the case of house dust and human fibers, I rubbed the toothbrush 50 times onto a wool cloth. The human fibers and house dust were not attracted to the face of the toothbrush; therefore, they were negative static electrically charged.

Human fibers and dust adhere to solid surfaces like glass mirrors and windows because these adherents are negatively charged and attach to positively charged surfaces. They also adhere to the inside surfaces of an automobile and other surfaces where humans or animals are present. Typically, cleaning fluids to remove these materials contain water in conjunction with surfactants and possibly ammonia to remove these adherents. Human fibers and dust can be removed by neutralizing the negative charges with water and detergents. However, the surfaces from which they were removed remain positively charged and human fibers and dust will reattach.

Addition of a negative static electrically charged liquid coating to the positive static electrically charged glass surface inhibits the dust from reattaching because the negative charge on the surface not only neutralizes the positive charge to which it is attracted, but additional amounts further provide a net negative charge which repels the dust particles.

Addition of a negative static electrically charged liquid coating to a paper or cloth substrate allows very thin coatings to be applied to the glass surface by rubbing the pre-coated paper or cloth sheet onto the glass surface. The film must be thin enough to minimize streaking, but the thickness must be high enough to convert the static electrical charge of the glass surface from positive to negative to repel human fibers, dust and silica based dirt.

Coating of the interior glass surfaces of an automobile or other enclosed areas having positive static electrically charged glass surfaces will benefit from the above invention by reduction in the amount of inside surface dust and fibers. Coating outside positive static electrically charged glass surfaces, which are subjected to the elements of weather, with a negative static electrically charged liquid coating will also be beneficial in repelling dust and dirt which are based on silica. Thus, the coating of the outside surface of an automobile window with a negative static electrically charged liquid will be beneficial in reducing dirt attachment. The water insoluble characteristic of the coating not only avoids discharging the surface by conduction through the water, but additionally prevents the active surface coating from being washed away by rain thereby providing durability and longevity.

The Electrostatic Discharge Association has published a Triboelectric Series in which materials are rated from positive static electrically charged to negative static electrically charged based on static charges after rubbing on a surface. Triboelectricity is the physics of charge generated through friction. Retention of the charge is dependent on the position of the material in the following table. The more positive or negative the material position on the chart, the greater the charge retention. For example, rubbing celluloid on nylon will produce a negative static electrical charge on the celluloid and a positive static electrical charge on the nylon. The farther apart the materials are on the list, the greater the static electrical charge will be and the greater the retention of the static electrical charge.

The list from positive to negative is as follows:
Positive
+
- - -
Air
Human Hands
Asbestos
Rabbit's Fur
Glass
Human Hair
Mica
Nylon
Wool
Lead
Cat's Fur
Silk
Aluminum
Paper
Cotton
Steel
Wood
Lucite
Sealing Wax
Amber
Polystyrene Rubber Balloon
Sulfur
Hard Rubber
Nickel; Copper
Brass, Silver
Gold, Platinum
Acetate, Rayon
Polyester
Celluloid
Polyurethane
Polyethylene
Polypropylene
Vinyl
Silicone
Silica
Teflon
- - -
Negative
–

I have found that the positive static electrostatic charge on glass surfaces can be changed to negative from positive by applying a thin coat of a water insoluble, negative static electrically charged fluid, containing silicone. Silicone is a derivative of silicon and has similar static electrical properties as its parent silica. Silicone fluid produces a very thin, acceptable surface coating which remains negatively charged after application. I have found that pre-coating a paper or cloth surface with the silicone fluid allows easy application of a thin coating of the silicone onto a solid surface. Although the silicone liquid can be sprayed directly onto the glass surface and then wiped, the best films are obtained by using paper or cloth wipers onto which the silicone liquid is sprayed and then wiped onto the glass surface. This provides for close control of the amount of composition applied to the surface. The composition of the invention can desirably be sprayed onto such wipers by a manufacturer and then the impregnated wipers can be packaged in sealed containers for sale to ultimate users ready to apply.

A water insoluble silicone liquid, which produces a negative static electrical charge on glass surfaces, is coated onto positive, static electrically charged glass windows, automobile and truck windshields and glass mirrors, causing the glass surfaces to become negatively charged. The silicone liquid is water insoluble so that, after it is applied, it will not attract or absorb water from the atmosphere that would provide a conduction path to discharge the negatively charged surface. Additionally, the water insolubility of the silicone liquid prevents it from being washed away by rain or condensation.

Only a few silicone compounds are water insoluble. The primary water insoluble silicone type is polydimethylsiloxane, which I have tested. It is available in viscosity from 5 centistokes to 100,000 centistokes. Petroleum distillate or white mineral oils can be used to reduce the viscosity of the silicones to eliminate streaking. A silicone that is too viscous will result in an excessively and unevenly thick coating layer. The preferred range of polydimethylsiloxane is 5 centistokes to 50 centistokes. If the film is not thin and relatively uniform, the coating will be streaked.

The prior art shows a variety of glass cleaning compounds that include water soluble silicone and are primarily designed to clean the glass surface and include water and surfactants. A user of the silicone composition of the invention might first clean the surface with one of these inexpensive, liquid cleaners to remove grime and smears. They use water soluble cleaners as additives and a very small amount of silicone, which is also water soluble or dispersible in water. The residual silicone in these products plus the remaining water soluble chemicals are not strong enough to repel dirt because, over time, the amount of silicone will be reduced as the water soluble chemicals and silicone are eroded by water. In the present invention, using a water insoluble silicone, the silicone will remain and will regain its charge after the surface dries.

The composition applied to the glass surface should be substantially anhydrous. The term "substantially anhydrous" is used to indicate the absence of water in an amount that would cause a noticeable reduction of the effectiveness of the composition or separate from the water in a container. This term is used because water is ordinarily present in small or trace amounts in any material that is exposed to the atmosphere. The presence of water would tend to discharge the surface. However, the presence of water in trace or small amounts or chemically combined with one or more constituents will not significantly discharge the negative surface charge caused by the coating of the invention.

Although silicone fluid viscosities vary from 5 centistokes to about 100,000 centistokes, the preferred range is 5 centistoke to 50 centistoke in order to reduce streaking of the coating on a glass surface that would impair the transparency of the glass. Viscosities higher than the 50 centistoke cause streaking. The viscosity of the composition must be sufficiently low that the material is free-flowing enough that it can be wiped onto the glass surface into a thin, uniform film. The composition may be substantially 100% water insoluble silicone within the viscosity range. Alternatively, the composition may be a more viscous silicone mixed, in an amount of at least 70% by weight of water insoluble silicone, with an organic solvent that is water insoluble but silicone soluble to reduce the viscosity to the acceptable range. As known to those skilled in the art, the higher the molecular weight of the silicone polymer, the higher its viscosity.

A 100 centistoke polydimethylsiloxane repelled dust from a glass surface coated with it, but the coating was streaked. I added 30% of petroleum distillate to 70% of 100 centistoke polydimethylsiloxane. This system repelled dust from a glass surface and was not streaked.

Thus, in summary, the use of a negative static electrically charged coating both neutralizes the inherent positive surface charge on the glass and provides an excess of negative charge to repel airborne particles. Because it is so concentrated, a sufficient amount can be applied to more than neutralize the positive surface charge. Because the material is water insoluble, it will be retained on the surface in an amount in excess of an amount that just neutralizes the positive surface charge and will not be washed away or retain water which would act to discharge the surface. Because it is anhydrous, it does not contain water which would neutralize the net charge.

An additional advantage is the fact that the negative static electrical charged liquid deposited on the glass surface reduces the need for repeated cleaning of the glass surface. Once cleaned and coated, the glass surface can be kept dirt free by periodic wiping with a paper or cloth surface coated with the negative static electrically charged silicone in order to replenish the coating on the glass surface.

I have tested the composition of the present invention on windows and mirrors in my home and on my automobile and found it still preventing dust after a year. Furthermore, because it is water insoluble, it resists removal by common household cleaners.

EXAMPLES

Example 1

The surface of a vertical glass mirror was determined to be electrostatically positively charged by allowing a negatively charged mixture of human fibers and dust to attach to the surface of a mirror in a home. The mirror was cleaned with a typical glass cleaner and then dried. A 3.4 gram, 11"×11" paper sheet was sprayed with 0.3 grams of a polydimethylsiloxane liquid having a viscosity of 5 cts. The pre-coated paper sheet was rubbed onto the vertical mirror without streaking. Human dust and fibers did not stick to the mirror surface. The surface of the mirror was still un-coated with human fibers and dust after one year.

Example 2

0.3 grams of a 50 cts polydimethyl silicone liquid were sprayed onto an 11"×11" paper sheet weighing 3.4 grams. The pre-coated sheet was rubbed onto a cleaned vertical mirror. Human dust and fibers did not stick to the coated mirror surface.

Example 3

A silicone coated paper sheet containing polydimethylsiloxane liquid with a viscosity of 8 centistokes was rubbed onto the outside surface of an automobile windshield which was subjected to outside elements. Rain water droplets adhered to the outside surface of the windshield as small nodules which disappeared after the windshield dried. Dirt coatings were significantly reduced compared with outside automobile windshield surfaces which were not coated with the silicone liquid.

Example 4

A paper sheet coated with polydimethylsiloxane liquid with a viscosity of 20 centistokes was rubbed onto the inside surface of an automobile windshield to produce a streak free film. Human fibers and dust did not adhere to the inside surface of the window.

Example 5

I investigated the concentration of silicone necessary to produce a coating which will repel dust and human hair fibers. I used a material called "Valvoline All Climate Lubricating Oil 5W30 which is an automobile oil. The percent of aliphatic petroleum distillate in the product is listed as 83–93% as shown in Household Products Database sponsored by The National Institute of Health. I assume that the remaining 15% material is compatible with the aliphatic petroleum distillate. A product called "ZEP Commercial Stainless Steel Cleaner", which contains silicone, lists petroleum distillates as the solvent.

The minimum amount of 5 centistoke polydimethylsiloxane liquid mixed with the Valvoline oil, which repelled human hair fibers and dust, was 70% by weight of the liquid silicone to 30% of the above oil. This concentration was marginal in that any concentration below that level did not inhibit dust and human hair fibers from attaching to a glass surface.

The following example explains the procedure to limit the silicone concentration to a minimum of 70% by weight. Various concentrations of 5 centistoke polydimethylsiloxane were mixed with Valvoline oil. The concentrations of silicone oil in Valvoline oil varied from 50% to 90%.

A series of 3.4 gram, 11"×11' paper sheets were sprayed individually, with mixtures, each weighing 0.3 grams. The mixtures consisted of a polydimethylsiloxane liquid having a viscosity of 5 centistokes and various amounts of Valvoline oil. The individual coated paper sheets were then rubbed onto individual 12"×12" glass plates to produce a streak free, thin film on the glass surface. A mixture of human fibers and dust was then placed onto the surface of a film coated glass plate in a horizontal position, and the glass was moved into a vertical position. Results were as follows:

| % silicone in silicone/Valvoline oil mixture | Attachment of human fibers and dust |
| --- | --- |
| 50% | Attached |
| 60% | Attached |
| 70% | Not Attached |
| 80% | Not Attached |
| 90% | Not Attached |
| 100% | Not Attached |

While certain preferred embodiments of the present invention have been disclosed in detail, it is to be understood that various modifications may be adopted without departing from the spirit of the invention or scope of the following claims.

The invention claimed is:

1. A method for treating a glass surface comprising: applying to the glass surface a water insoluble, negative static electrically charged coating consisting of a water insoluble silicone oil, the silicone oil being a polydimethylsiloxane having a viscosity of from 5 to 100,000 centistokes at 25 degrees C., the coating being of sufficient thickness so that it will repel human fibers, dust and silica-based dirt and thin enough so that it will not streak and wherein a paper or cloth towel is pre-coated with a water insoluble, negative static electrically charged coating consisting of the water insoluble silicone oil and the coated paper or cloth towel is rubbed onto the glass surface producing the coating on the glass surface.

2. A method in accordance with claim 1 wherein the coating on the glass surface has a viscosity substantially within the range of 5 centistokes to 50 centistokes.

3. A method for treating a glass surface comprising: pre-coating a paper or cloth towel with a water insoluble, negative static electrically charged coating wherein the coating consists of a substantially anhydrous mixture consisting of a water-insoluble, silicone-soluble, organic liquid and at least 70% by weight of a water insoluble polydimethylsiloxane liquid having a viscosity from 5 to 100,000 centistokes at 25 degrees C. and rubbing the coated paper or cloth towel onto the glass surface to produce a coating on the glass surface consisting of the organic liquid and at least 70% by weight of the polydimethylsiloxane liquid that is of sufficient thinness to be streak free and of sufficient thickness to repel human fibers, dust and silica-based dirt.

4. A method in accordance with claim 3 wherein the coating on the glass surface has a viscosity substantially within the range of 5 centistokes to 50 centistokes.

* * * * *